United States Patent Office 3,491,189
Patented Jan. 20, 1970

3,491,189
FUNGICIDES FOR PLANT PROTECTION
Guenter Scheuerer, Ludwigshafen (Rhine) and Ernst-Heinrich Pommer, Limburgerhof, Pfalz, Germany, assignors to Badische Anilin- & Soda-Fabrik Aktiengesellschaft, Ludwigshafen (Rhine), Rhineland-Palatinate, Germany
No Drawing. Filed Feb. 2, 1966, Ser. No. 524,474
Claims priority, application Germany, Feb. 27, 1965,
B 80,751
Int. Cl. A01n 9/24
U.S. Cl. 424—245                                    1 Claim

ABSTRACT OF THE DISCLOSURE

Process for controlling fungus in which a copper salt of dehydroacetic acid is applied to the object to be protected. It was found that the copper salt of dehydroacetic acid has a broad spectrum of fungicidal activity and is far more effective than other salts of dehydroacetic acid in controlling various kinds of mold fungi or true or pseudo-mildew fungi.

---

The present invention relates to a process for controlling fungus with the copper salt of hydroacetic acid.

It is an object of the invention to control fungus with the copper salt of hydroacetic acid. A further object of the invention is to control various types of fungus with a single active substance.

It is known that dehydroacetic acid and its sodium, potassium, ammonium and calcium salts may be used as agents for preserving food (German patent specification Nos. 958,522 and 958,523). It is also known from the literature that dehydroacetic acid and its sodium salt may be used for preventing the development of various kinds of mold fungi, such as *Penicillium glaucum*, *Aspergillus niger* and *Botrytis cinerea* (Deutsche Lebensmittel-Rundschau 48 (1952) 16–18, and Plant Disease Reporter 36 (1952) 309). It is a disadvantage of the use of dehydroacetic acid and its sodium salt that they are unsuitable as agents for protecting plants against pseudo and true mildew fungus because they have inadequate fungicidal activity against these injurious fungi.

We have now found that the copper salt of dehydroacetic acid does not exhibit the above-mentioned disadvantages but has a broad spectrum of fungicidal activity and may be used for controlling a great variety of injurious fungi, for example various kinds of mold fungi or true or pseudo mildew fungi.

The active substance may be processed in the usual way by adding extenders, solvents, emulsifiers or other assistants to suspensions, solutions, emulsifiable concentrate, powders or dusts and used in these forms. It may also be used in conjunction with other plant protection agents.

The production of the copper salt of dehydroacetic acid may be carried out for example by the method described in J. Chem. Soc. 65 (1894) 259 by bringing together aqueous solutions of sodium dehydroacetate and copper acetate or sulfate. The copper salt is obtained anhydrous or containing water of crystallization depending on the temperature used for drying.

The good fungicidal action of the copper salt of dehydroacetic acid may be seen from the following examples.

EXAMPLE 1

The following table gives the inhibition values against the fungus *Botrytis cinerea* in a nutrient solution. 0.05% of active substance is added to a nutrient solution composed of grape juice and water in the ratio 1:1, inoculated with fungal spores and left for five days in culture dishes at 22° to 23° C. The extent of the fungus development is then determined. This is graded between 0=no fungus growth and 5=uninhibited fungus growth.

TABLE

| Active substance: | 0.05% of active substance in nutrient solution |
|---|---|
| Copper dehydroacetate | 0 |
| For comparison: | |
| Dehydroacetic acid | 3 |
| Sodium dehydroacetate | 2 |
| Control (untreated) | 5 |

EXAMPLE 2

Vine peronospora test

Leaves of potted vines of the variety Müller-Thurgau are sprayed with aqueous dispersions which contain 80% of active substance and 20% of sodium lignin sulfonate in the dry substance. A 0.125% spray (with reference to the dry substance) is used. After the sprayed coating has dried, the leaves are infected with a zoospore suspension of *Plasmopara viticola*. The plants are first kept for sixteen hours at 20° C. in a moist chamber saturated with water vapor and then for eight days in a greenhouse at temperatures of from 20° to 30° C. After this period, the plants are again placed for sixteen hours in the moist chamber to accelerate and intensify the outbreak of sporangiophores. Then the proportion of the underside of the leaves which is covered with spores is determined. Untreated infected control plants serve as a comparison.

The intensity of attack is given in values 0 to 5, the percentage leaf attack being evaluated as follows:

| Leaf attack | Percent |
|---|---|
| 0 | 0 |
| 1 | 1–5 |
| 2 | 6–20 |
| 3 | 21–50 |
| 4 | 51–85 |
| 5 | 86–100 |

| Active substance | Intensity of attack after spraying with spray liquor having the percentage strength | |
|---|---|---|
| | 0.12 | 0.06 |
| Copper dehydroacetate | 0 | 0 |
| For comparison: | | |
| Dehydroacetic acid | 3 | 4 |
| Sodium dehydroacetate | 3 | 4 |
| Zinc ethylene-bis-dithiocarbamate | 2 | 3 |
| Control (untreated) | 5 | 5 |

EXAMPLE 3

Leaves of barley seedlings grown in pots are sprayed with aqueous emulsions of 80% active substance and 20% emulsifier; the coating is allowed to dry and is then dusted with oidia (spores) of barley mildew (*Erysiphe graminis* var. *hordei*). The test plants are then kept in a greenhouse at temperatures of from 20° to 22° C. and 75 to 80% relative humidity. Ten days later, the extent of development of the mildew fungus is determined.

| Active substance | Attack on leaves after spraying with active substance liquor of the Percentage strength | |
|---|---|---|
| | 0.2 | 0.1 |
| Copper dehydroacetate | 0 | 1 |
| For comparison: | | |
| Dehydroacetic acid | 4 | 5 |
| Sodium dehydroacetate | 5 | 5 |
| Wettable sulfur | 1 | 2 |
| Control (untreated) | 5 | 5 |

0=no attack, graded up to 5=total attack.

We claim:
1. A process for controlling fungi which comprises: applying copper dehydroacetate to living plants in an amount sufficient to protect said plants from fungus attack.

References Cited

UNITED STATES PATENTS

| | | | |
|---|---|---|---|
| 718,537 | 1/1903 | Smith et al. | 424—141 |
| 891,567 | 6/1908 | Rumm | 424—141 |
| 1,803,870 | 5/1931 | Sanders | 424—141 |
| 3,078,213 | 2/1963 | Pomot et al. | 424—245 |
| 2,208,253 | 7/1940 | Flenner et al. | 167—22 |
| 2,655,461 | 10/1953 | Kise | 167—22 |
| 2,722,483 | 11/1955 | Winkler | 167—33 |
| 2,774,772 | 12/1956 | Longley et al. | 167—33 |
| 2,977,279 | 3/1961 | Kosmin | 167—22 |
| 2,998,442 | 8/1961 | Allais et al. | 167—22 |
| 3,093,659 | 6/1963 | Bell et al. | 167—33 |
| 3,168,407 | 2/1965 | Skrimshire et al. | 167—33 |
| 2,791,590 | 5/1957 | Rapp | 260—343.5 |

OTHER REFERENCES

Collie et al., Salts of Dehydracetic acid, cited by appl.
Scheurer et al, Copper dehydroacetate, a fungicide, CA 65 1966, p. 14361 (1966).
Iguchi et al., Pyrone derivatives etc. (1959) CA 54, p. 4553 (1960).
Masuo et al., Antifungal substances (1953) CA 51 p. 8210 (1957).
Thompson, Postharvest chemical treatment for the control of strawberry fruit rots (1958) CA 52 (1958), pp. 20837–38.

LEWIS GOTTS, Primary Examiner

G. HOLLRAH, Assistant Examiner